(12) United States Patent
Antani et al.

(10) Patent No.: US 8,918,602 B2
(45) Date of Patent: Dec. 23, 2014

(54) DYNAMICALLY ALTERING TIME TO LIVE VALUES IN A DATA CACHE

(75) Inventors: Snehal S. Antani, Hyde Park, NY (US); Kulvir S. Bhogal, Pflugerville, TX (US); Nitin Gaur, Round Rock, TX (US); Christopher D. Johnson, Rochester, MN (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 13/235,633

(22) Filed: Sep. 19, 2011

(65) Prior Publication Data

US 2013/0073809 A1  Mar. 21, 2013

(51) Int. Cl.
*G06F 12/08* (2006.01)
*G06F 12/12* (2006.01)

(52) U.S. Cl.
CPC ............ *G06F 12/121* (2013.01); *G06F 12/123* (2013.01); *G06F 2212/465* (2013.01)
USPC ............................ 711/159; 711/133; 711/136

(58) Field of Classification Search
USPC .......................................... 711/159, 133, 136
See application file for complete search history.

(56) References Cited

U.S. PATENT DOCUMENTS

| 6,772,203 | B1* | 8/2004 | Feiertag et al. | 709/219 |
| 6,983,318 | B2 | 1/2006 | Doyle | |
| 7,853,576 | B2 | 12/2010 | Narang et al. | |
| 2003/0188106 | A1* | 10/2003 | Cohen | 711/133 |
| 2005/0027943 | A1 | 2/2005 | Steere et al. | |
| 2005/0210508 | A1 | 9/2005 | Lau et al. | |
| 2009/0210631 | A1* | 8/2009 | Bosworth et al. | 711/141 |
| 2010/0077152 | A1* | 3/2010 | Jain | 711/133 |
| 2010/0293335 | A1 | 11/2010 | Muthiah et al. | |
| 2011/0264865 | A1* | 10/2011 | Mobarak et al. | 711/141 |
| 2012/0246202 | A1* | 9/2012 | Surtani et al. | 707/812 |

OTHER PUBLICATIONS

I. Tomohiro et al., "DNS Cache-Record Coordination Using Adaptive Cache TTL Adjustment", International Journal of Computer and Network Security, vol. 2, No. 1, Jan. 2010, pp. 66-69.

* cited by examiner

*Primary Examiner* — Hashem Farrokh
(74) *Attorney, Agent, or Firm* — A. Bruce Clay

(57) ABSTRACT

A TTL value for a data object stored in-memory in a data grid is dynamically adjusted. A stale data tolerance policy is set. Low toleration for staleness would mean that eviction is certain, no matter the cost, and high toleration would mean that the TTL value would be set based on total cost. Metrics to report a cost to re-create and re-store the data object are calculated, and the TTL value is adjusted based on calculated metrics. Further factors, such as, cleanup time to evict data from a storage site, may be considered in the total cost.

6 Claims, 4 Drawing Sheets

DYNAMICALLY ALTERING TIME TO LIVE VALUES IN A DATA CACHE

BACKGROUND

The present invention relates in general to data storage, and more particularly, to altering Time to Live (TTL) values in a data cache in response to cost factors.

A cache is an in-memory storage component that transparently stores data so that future requests for that data can be served faster. The data that is stored may be previously computed values or copies of values stored elsewhere. Since cache size is relatively small, there is typically more data than the available amount of in-memory storage. Thus, data caches usually implement an eviction policy such as, Time to Live (TTL), Least Recently Used (LRU), or Least Frequently Used (LFU), each of which usually define a fixed value based on the client's tolerance for stale data and the amount of space available in the cache. The eviction policies do not take into account the expense for recreating the data if it is requested once it has been evicted. It is oftentimes desirable to temporarily increase the size of the cache and increase the eviction policy window during anticipated or actual higher volumes of traffic through a provisioning process.

There are also use cases where the cost to re-create the data in the cache outweighs the cost of reading stale data. For example, if the database is unreachable or the connection to the database has been saturated, then having the eviction policy temporarily disabled or increased is more beneficial than having the user wait indefinitely or suffer a connection timeout, which can cascade the database problem to the front-end systems.

BRIEF SUMMARY

According to one embodiment of the present invention, a TTL value for a data object stored in-memory in a data grid is dynamically adjusted. A stale data tolerance policy is set. Metrics to report a cost to re-create and re-store the data object are calculated, and the TTL value is adjusted based on calculated metrics.

According to one embodiment of the present invention, a computer system dynamically adjusts a TTL value for a data object stored in-memory in a data grid. The computer system comprises a processor, and memory connected to the processor. The memory is encoded with instructions that when executed comprise instructions for setting a stale data tolerance policy. The instructions also comprise instructions for calculating metrics to report a cost to re-create and re-store the data object, and to adjust the TTL value based on the metrics.

According to one embodiment of the present invention, a computer program product dynamically adjusts a TTL value for a data object stored in-memory in a data grid. The computer program product comprises a computer readable storage medium having computer readable program code embodied therewith. The computer readable program code comprises computer readable program code configured to set a stale data tolerance policy. The computer readable program code is also configured to calculate metrics to report a cost to re-create and re-store the data object, and to adjust the TTL value based on the metrics.

DETAILED DESCRIPTION

Figure 1:
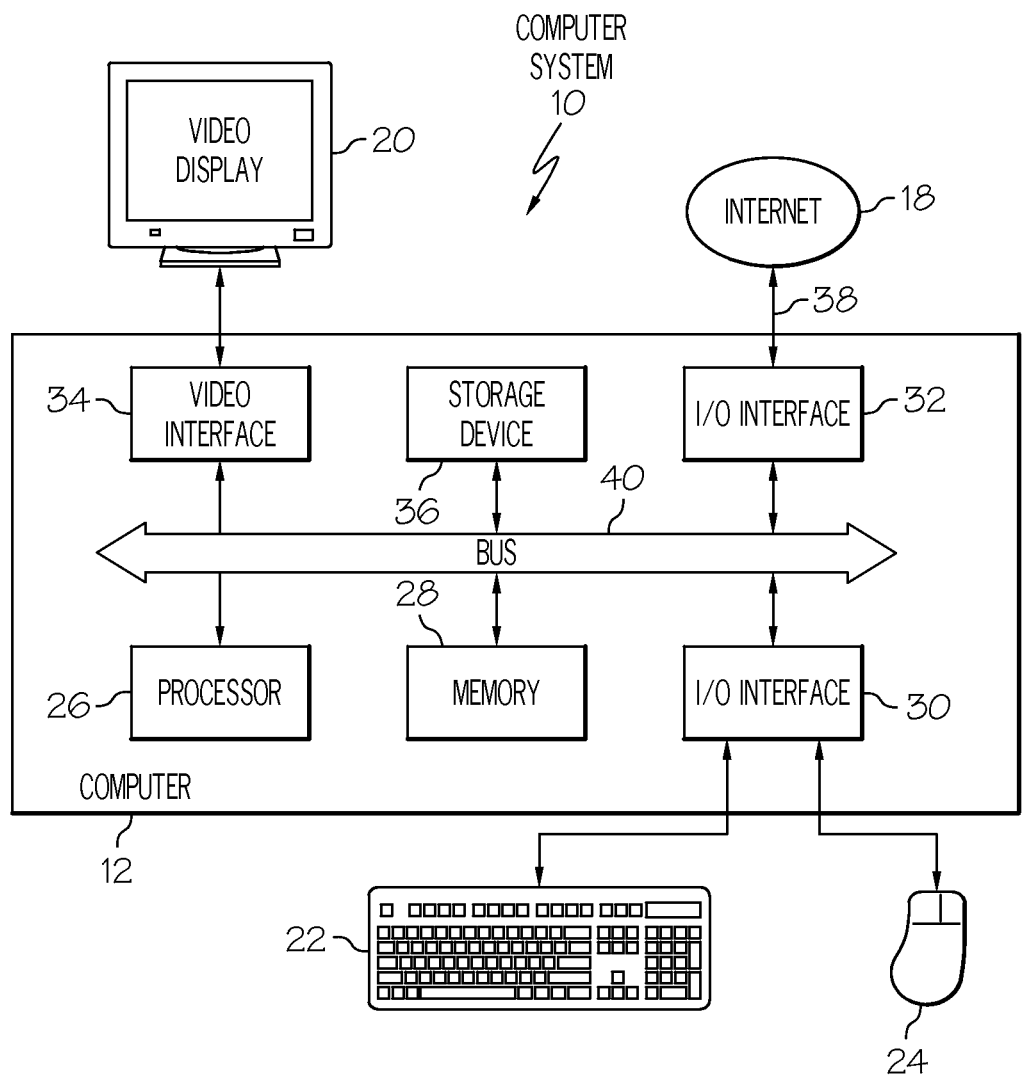
FIG. 1 is an illustration of computer hardware within which an embodiment of the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for dynamically altering time to live values in a data cache. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 2:
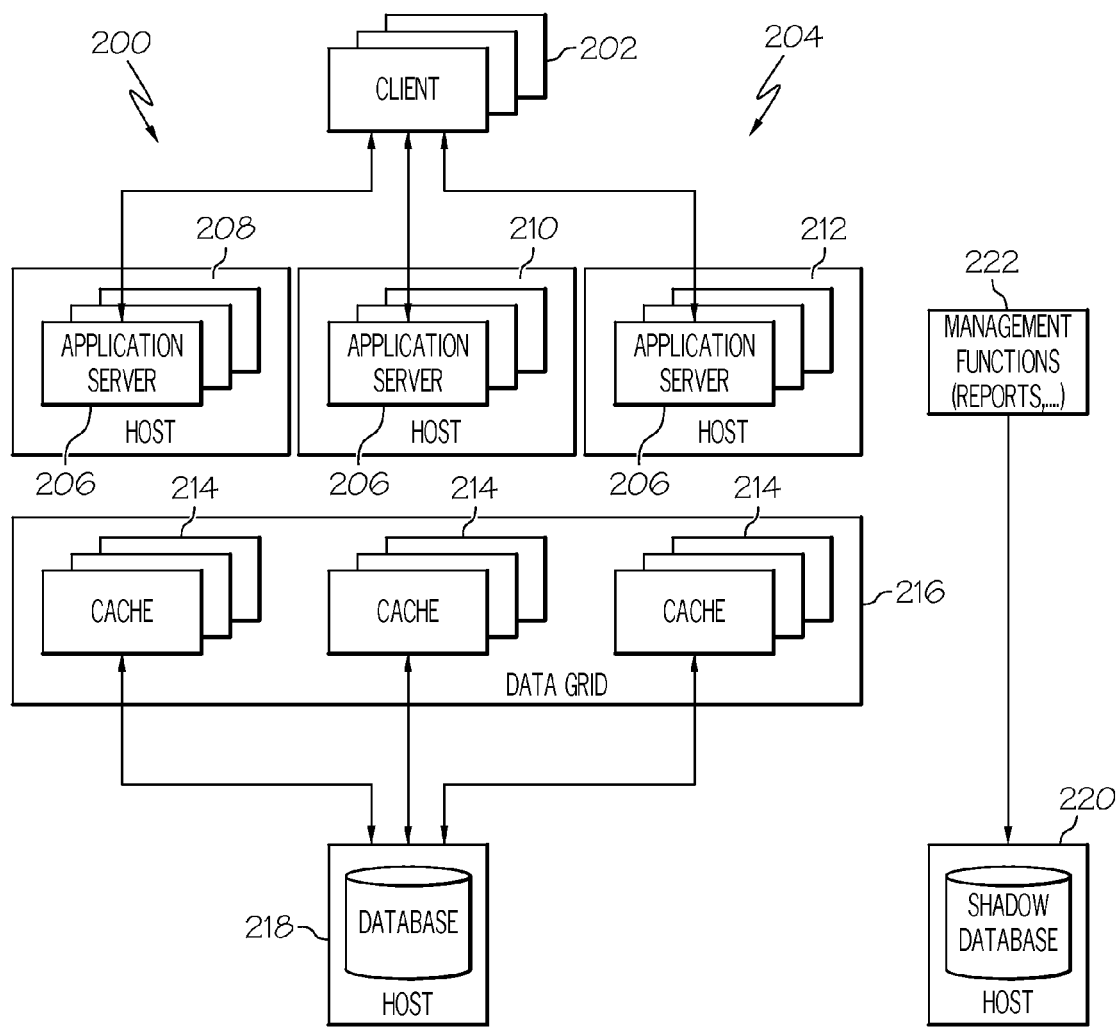
FIG. 2 is an in-memory data storage system as is known in the prior art.

With reference now to FIG. 2, a client-server environment 200 in accordance with the prior art is illustrated. A plurality of clients 202 are interconnected to a host system 204. The host system 204 may include a plurality of application servers 206 on a plurality of host servers 208, 210, and 212.

Each application server 206 is provided with a cache 214. Each application server 206 can, itself, be a client and can connect to a set of inter-connected Java Virtual Machines (JVMs) which collectively form a data grid 216 (a JVM provides an address space, a container, of sorts, to store objects, so the purpose of an In-Memory Data Grid (IMDG) that participates in a data grid is to provide a container to store java objects). The application server 206 connects to the grid 216 like a client and seeks data objects which reside in the grid 216. A timer (known as Time-To-Live or TTL) is kept on these data objects in the grid 216. The timer is kept to prevent data objects from sitting unused and occupying space forever (even though not needed) and consuming limited in-memory storage resources. If a data object is frequently requested, or the cost of fetching the data plus the cost of replicating/copying the data is high (which implies excessive resource consumption), then it may be cheaper to increase the TTL so an application can continue to access the data objects in the grid 216.

A host database 218 provides persistent storage for the data used by the application servers 206. As is known in the art, the caches 214, and, thus, the data grid 216, are used to store data that is beneficial to computation efficiency of the application servers 206, i.e., data stored in the caches 214 is accessed faster than data in the database 218. A shadow database 220 is used as a backup to the database 218 (a copy, thereof) and to obtain data for management function, such as, for example, reports.

Every time an object is updated/evicted/invalidated, any synchronous or asynchronous copy of the object is affected, and it may be necessary to go all the way to a backend database (218) to fetch that data, make any calculations with the data, and make copies (for storage in a plurality of the caches 214 in the data grid 216 and in the backup database 220), which adds performance cost to the operation of the grid 216. A business can decide how many synchronous and asynchronous copies are required within a data grid or across data grids, to ensure high availability and data grid consistency. However, the standard IMDG implementations set a TTL based only on the time it takes to fetch the data from the backend database, and does not consider the added cost of creating copies within the data grid or the backup/shadow database. Thus, TTL is the life of an object in the grid as defined by the business, which can factor in the time it takes to fetch from a single backend database.

An embodiment of the present invention does not use just the fetch time from a backend database, but also factors in the cost of replicating or making copies and cleanup. The varying degrees of cost (for example, synchronous replication or copying, is more expensive than asynchronous replication/copying), and the cost of having no copy available, is not just the cost of fetching the data from a database. A decision to dynamically increase TTL (or decrease or leave it unaltered) of the object in a cache is based on the total cost of repopulating the data in the grid.

As used herein, total cost is defined as the cost of fetching the data from the backend database plus the cost of an asynchronous/synchronous replication plus the cost of cleanup (time for data eviction (DEv)+time for removal of replicas (DRr) (Async or Sync)). If the total cost of rehydrating or repopulating the data in the grid is a certain value (per a policy, see Table 1, i.e., if data retrieval time is X then increase TTL to Y), the TTL will be adjusted to make the entire process of lookup or fetch and cache population more efficient and compute efficient. In order to ensure the efficiency of the data grid operation, one embodiment of the present invention dynamically increases the TTL, when the cost of grid hydration is computationally intensive. The stale data toleration policy, as defined, drives the action of dynamic changes of the TTL.

Figure 3:
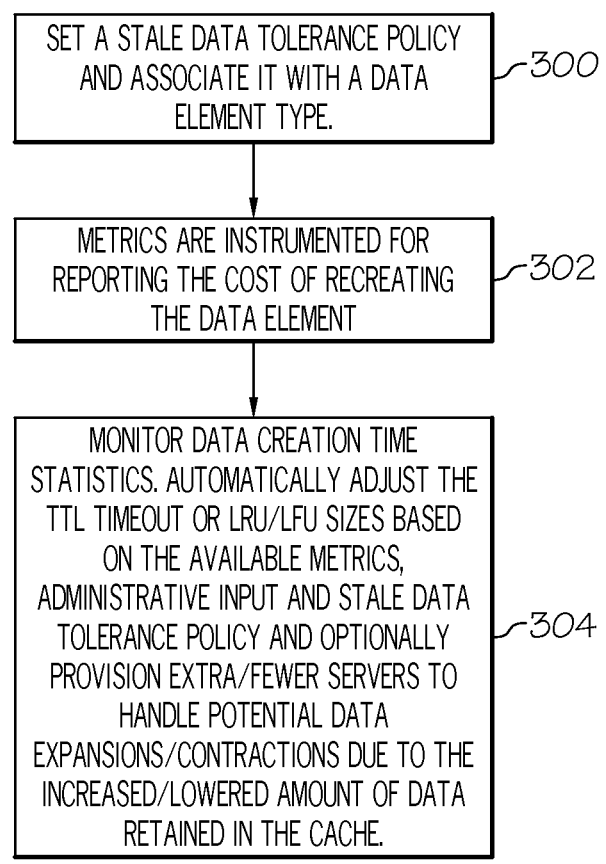
FIG. 3 is flow chart in accordance with one embodiment of the present invention.

FIG. 3 illustrates an example of the flow of the present invention. An application, such as one that runs on the application servers 206, uses a data grid (216, FIG. 2) as a side cache to store rendered portlets which come from several different services (database, web service, CICS, etc.). The portlets are generated with a "generatePage( )" method and are stored in a distributed map named "genPagesCache." Referring to FIG. 3, at block 300, the customer sets a stale data tolerance policy and associates it with the "genPagesCache" map. For example, a policy is set as shown in Table 1:

TABLE 1

| Data retrieval time in milliseconds (ms) | TTL Stale data tolerance policy |
|---|---|
| Less than 500 milliseconds | 30 seconds |
| >500 ms <5000 ms | 300 seconds |
| >5000 ms | Forever |

Metrics for reporting the cost of recreating the data element are instrumented at block 302. For example, the customer's "generatePage( )" method is instrumented to report the time it takes to generate the portlet page and store it in the cache (the data element). This can be done with aspect-oriented programming (AOP) or other common instrumentation methods.

At block 304, data creation time statistics (the instrumented metrics) are monitored, for example, by a monitoring agent. The TTL timeout used for data eviction (some common eviction tools are Least Recently Used (LRU) or Least Frequently Used (LFU) values) are automatically adjusted based on the available metrics, administrative input, stale data tolerance policy, and extra servers are optionally provisioned to handle potential data expansions due to any increased amount of data retained in the cache. Likewise, fewer servers/cache in-memory storage space may be provisioned if lowered amounts of data are retained due to lower costs of recreation, as determined by the instrumented metrics.

One embodiment of the present invention is a predictive analysis done to prevent eviction of a cache entry that is expensive to re-create and can cause further cache or grid performance degradation. This is important in an IMDG, as grid operations, such as eviction and replication, can be a major cause of grid instability.

In one embodiment of the present invention, Cr is the total value or the total cost of retrieving the data from a database into a distributed cache grid. The Cache Monitoring system will monitor the Periodic Data retrieval time from the data source (Rt). If there are multiple data sources/databases (for a composite object), an average of the sum total of all data retrieval times (dRt) is taken. Periodic replication time is based on replication policy (SRp), e.g. synchronous and/or Asynchronous (AsRp). Therefore, the data retrieval cost is determined using the following formula:

$$Cr = (Rt \text{ or } dRt) + SRp^* + AsRp^*$$

(*If no replication policy is defined, either synchronous or asynchronous, then the value of SRp (and/or) AsRp=1, so that the cost of replication is not 0.)

Another factor to consider is clean up cost. Clean up cost (Cc) is the time to evict data from a storage site (DEv) and the time to remove any replicas (DRr):

$$Cc = DEv + DRr$$

Therefore total cost:

$$Ct = Cr + Cc$$

An initial TTLi value is set either by configuration (static) or by running an average of Periodic Data retrieval time of a percentage of objects created in the grid based on grid warm up time, for example, 40% of total cache (Tc) load time. The initial TTLi then becomes:

$$TTLi = Cr \times (Tc) \times (40/100)$$

A cache entry staleness toleration is set (none/high) (see Table 1). Low toleration for staleness would mean that eviction is certain, no matter the cost, and high toleration would mean that the TTL would be set based on values of Cr, TTL and staleness toleration.

The TTL value is changed (increased), if the total cost (Ct) reaches a threshold, for example, 20% more than the initial value, as that indicates cache performance degradation (due to cache entry re-creation and replication factors).

The Cache Monitoring system in accordance with an embodiment of the present invention can perform this calculation continuously for all cache entries that are near eviction. The IMDG ensures high availability by ensuring there are redundant copies of data/objects in the grid. Thus, in the event of a JVM/Process failure, a secondary copy of data/object is available. This is enforced by the policy driven approach of replication and the present invention.

Figure 4:
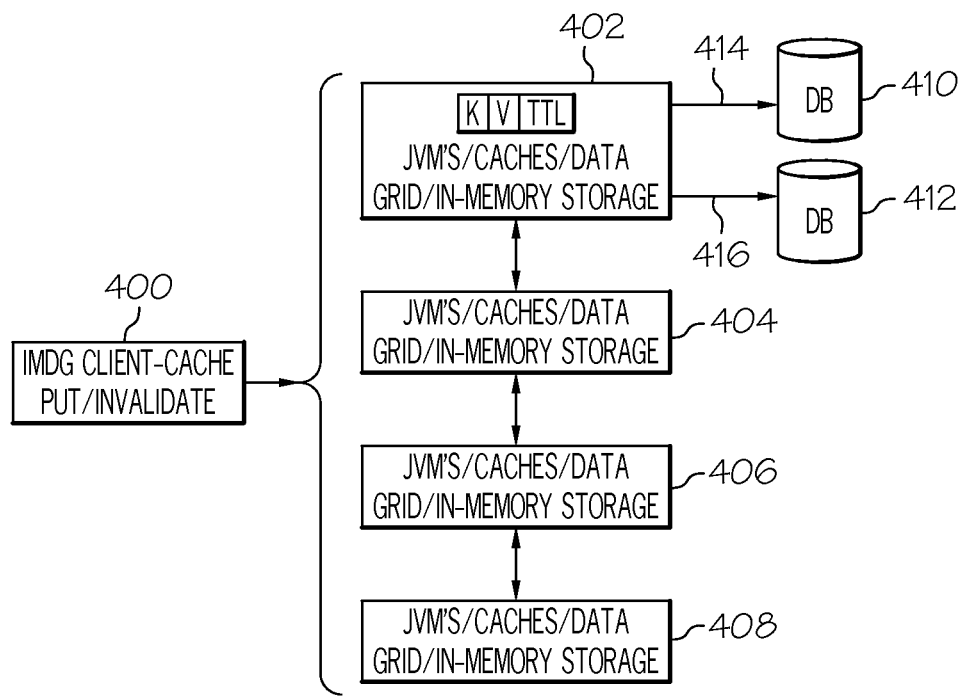
FIG. 4 illustrates varying fetch times and replications of an in-memory data storage system in accordance with one embodiment of the present invention.

Referring to FIG. 4, one embodiment of the present invention is illustrated. An IMDG Client 400 adds or invalidates data into a plurality of JVM's/caches/Data Grid/in-memory storage 402, 404, 406, and 408. Each cache 402-408 comprises a key value (K) for identification of an object Value V which has a time to live TTL value. For the purpose of illustration, the object value V is a composite object obtained from database 410 and database 412.

The time needed to get the first part (for example, a user's name and bank account balance) of the composite object value V for cache 402 from Db 410 (bank 1) is depicted by arrow 414 and can be, for example, 500 ms. The time needed to get the second part (for example, the user's name and bank account balance) of the composite object value V for cache 402 from db 412 (bank 2) is depicted by arrow 416 and can be, for example, 700 ms. The cost to fetch, dRt, is now 500 ms+700 ms=1200 ms.

After obtaining this composite value V, depending upon a business policy, it will be necessary to make copies. For example, the business requires one synchronous replica which takes 40 ms (SRp) to create in cache 404. Additionally, the business requires two asynchronous replicas taking 20 ms (AsRp) each, one in cache 406 and one in cache 408, respectively, making the data retrieval cost (Cr=dRt+SRp+AsRp) equal 1280 ms. Thus, if it is possible to simply increase the TTL for the data object V, 1280 ms can be saved. If there are a million such objects, it is possible to save computation power. Although not shown in the example, the clean-up cost could make this savings even greater.

The present invention provides advantages over the prior art with the addition of dynamic adjustments of the TTL based on a staleness policy which factors in current replication policy to ensure that an object resides in a grid for a calculated time period, and, thus, ensures that the grid performance is optimal.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for dynamically adjusting a TTL value for a data object stored in-memory in a data grid, comprising:
    setting a stale data tolerance policy;
    calculating metrics with a processor to report a cost to re-create and re-store the data object;
    adjusting the TTL value based on said metrics, said adjusting the TTL value further comprising using administrative input and including a stale data policy;
    provisioning additional in-memory storage in order to handle potential data expansion resulting from storing the data for longer periods of time before eviction when a cost of recreation, thereof, is above a policy value; and
    provisioning less in-memory storage in order to benefit from potential data contraction resulting from storing the data for shorter periods of time before eviction when a cost of recreation, thereof, is below a policy value.

2. The method of claim 1, wherein calculating metrics comprises using aspect-oriented programming instrumentation examining metrics.

3. A computer system for dynamically adjusting a TTL value for a data object stored in-memory in a data grid, comprising:
    a processor; and
    memory connected to the processor, wherein the memory is encoded with instructions and wherein the instructions when executed comprise:
    instructions for setting a stale data tolerance policy;
    instructions for calculating metrics to report a cost to re-create and re-store the data object;
    instructions for adjusting the TTL value based on said metrics, said instructions for adjusting the TTL value further comprising instructions for using administrative input and instructions for including a stale data policy;
    instructions for provisioning additional in-memory storage in order to handle data expansion resulting from storing the data in-memory for longer periods of time before eviction, thereof, when a cost of recreation thereof is above a policy value; and
    instructions for provisioning less in-memory storage in order to benefit from data contraction resulting from storing the data in-memory for shorter periods of time before eviction, thereof, when a cost of recreation thereof is below a policy value.

4. The system of claim 3, wherein said instructions for calculating metrics comprises instructions for using aspect-oriented programming instrumentation examining metrics.

5. A computer program product for dynamically adjusting a TTL value for a data object stored in-memory in a data grid, the computer program product comprising a non-transitory computer readable storage medium having computer readable program code embodied therewith, the computer readable program code comprising:
    computer readable program code configured to set a stale data tolerance policy;

computer readable program code configured to calculate metrics to report a cost to re-create and re-store the data object;

computer readable program code configured to adjust the TTL value based on said metrics, said computer readable program code configured to adjust the TTL value further comprising computer readable program code configured to use administrative input and computer readable program code configured to include a stale data policy;

computer readable program code configured to provision additional in-memory storage in order to handle potential data expansion resulting from storing the data in-memory for longer periods of time before eviction thereof, when a cost of recreation, thereof, is above a policy value; and computer readable program code configured to provision less in-memory storage in order to benefit from potential data contraction resulting from storing the data in-memory for shorter periods of time before eviction thereof, when a cost of recreation, thereof, is below a policy value.

6. The system of claim 5, wherein said computer readable program code configured to calculate metrics comprises computer readable program code configured to use aspect-oriented programming instrumentation examining metrics.

* * * * *